United States Patent
Agner et al.

(10) Patent No.: US 7,455,159 B2
(45) Date of Patent: Nov. 25, 2008

(54) TORQUE TRANSMITTING UNIT AND POWER TRAIN HAVING A TORQUE TRANSMITTING UNIT

(75) Inventors: Ivo Agner, Bühl (DE); Jochen Bergmann, Karlsruhe (DE); Oliver Nöhl, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 122 days.

(21) Appl. No.: 11/156,616

(22) Filed: Jun. 20, 2005

(65) Prior Publication Data
US 2006/0000684 A1 Jan. 5, 2006

(30) Foreign Application Priority Data
Jun. 21, 2004 (DE) .................. 10 2004 029 781

(51) Int. Cl.
*F16D 13/72* (2006.01)
(52) U.S. Cl. .................. 192/70.12; 192/48.8
(58) Field of Classification Search .................. None
See application file for complete search history.

(56) References Cited

U.S. PATENT DOCUMENTS

| | | | | |
|---|---|---|---|---|
| 3,314,513 | A | * | 4/1967 | Lake et al. ............ 192/91 R |
| 5,788,037 | A | * | 8/1998 | Forsyth et al. ........ 192/70.12 |
| 2001/0025760 | A1 | | 10/2001 | Dau et al. ............. 192/48.91 |
| 2002/0065171 | A1 | | 5/2002 | Raber ................... 477/175 |
| 2002/0157914 | A1 | | 10/2002 | Bassett ................. 192/30 V |
| 2004/0173429 | A1 | | 9/2004 | Friedmann et al. ...... 192/99 A |
| 2005/0139442 | A1 | * | 6/2005 | Agner et al. .......... 192/48.8 |

FOREIGN PATENT DOCUMENTS

| | | |
|---|---|---|
| DE | 31 35 995 A1 | 3/1983 |
| DE | 100 33 649 A1 | 2/2001 |
| DE | 103 16 445 A1 | 10/2003 |
| DE | 102 54 066 A1 | 6/2004 |
| DE | 103 01 405 A1 | 7/2004 |
| DE | 10 2004 009 832 A1 | 9/2004 |
| EP | 1 191 258 A2 | 3/2002 |
| EP | 1 398 520 A2 | 3/2004 |
| FR | 2 778 707 A1 | 11/1999 |
| GB | 2 124 321 A | 2/1984 |
| GB | 2133484 A * | 7/1984 |

* cited by examiner

*Primary Examiner*—Richard M. Lorence
(74) *Attorney, Agent, or Firm*—Alfred J. Mangels (57) ABSTRACT

A torque transmitting unit in the power train of a motor vehicle for transmitting torque between an engine crankshaft, and a transmission having at least one input shaft with at least one friction clutch. The transmission input shaft is coupled with the crankshaft by the friction clutch, which includes friction disks on the power input and/or output sides, and that are pressed together axially along an axis of rotation of the transmission input shaft to form a frictional engagement through a plurality of disks arranged in alternating layers in the axial direction. The disks are pressed against a stop by an actuator and with an actuating bearing interposed, wherein the actuator is connected to a fixed part of the transmission housing in a rotationally fixed connection. The friction clutch is a wet clutch.

12 Claims, 3 Drawing Sheets

TORQUE TRANSMITTING UNIT AND POWER TRAIN HAVING A TORQUE TRANSMITTING UNIT

BACKGROUND OF THE INVENTION

1. Field of the Invention

The present invention relates to a torque transmitting unit in the power train of a motor vehicle for transmitting torque between a combustion engine having a crankshaft, and a transmission having at least one input shaft with at least one friction clutch. The invention also relates to a torque transmitting unit in particular for a power train having a combustion engine and a double clutch transmission having two transmission input shafts and one transmission output shaft, each transmission input shaft being connectable to a combustion engine by means of a clutch of the torque transmitting unit.

2. Description of the Related Art

Double clutch transmissions having two transmission input shafts, wherein there is a torque transmitting unit including a wet clutch for each transmission input shaft, the wet clutches being operated hydrostatically by means of corresponding piston units, and the requisite pressure for this as well as possibly the pressure for cooling the clutches being generated in case of need by a pressure medium pump, are known. Such pumps deliver high performance, and consume correspondingly large amounts of energy. Between the pump and the piston units, to build up a pressure produced by the pump by means of a pressure medium to operate the clutches, there are rotating unions having seals that seal between rotating and stationary components. Appropriate measures must be taken to safeguard the service life of these seals.

The object of the present invention is to improve a torque transmitting unit and a power train so that a high power output of the combustion engine may be transmitted through the clutches of the two transmission input shafts with little consumption of energy, while at the same time simple and reliable operation of the clutches is possible with high transfer performance and long service life. In addition, the costs of manufacture should be low and the production and installation simple.

SUMMARY OF THE INVENTION

The object is achieved in a torque transmitting unit in the power train of a motor vehicle for transmitting torque between a combustion engine having a crankshaft, and a transmission having at least one input shaft with at least one friction clutch, by combining the following features: The transmission input shaft may be coupled with the crankshaft by means of the friction clutch; the friction clutch has friction units on the power input and/or output sides, which may be acted upon by being pressed together axially along an axis of rotation of the transmission input shaft to form a frictional engagement; the frictional engagement or engagements is or are formed by a plurality of frictional counterparts from the input and output sides arranged in alternating layers in the axial direction; the friction unit or units of the friction clutch are pressed against a stop by an actuator assigned to the particular friction unit; with the actuator of the friction clutch, and with an actuating bearing interposed, an actuating device that operates axially on the particular actuator is arranged, that is connected to a fixed part of the housing in a rotationally fixed connection; the friction clutch is operated in wet mode.

The object is achieved by means of a torque transmitting unit in the power train of a motor vehicle for transmitting torque between a combustion engine having a crankshaft, and a double clutch transmission having at least two input shafts with two friction clutches, with the following features:

Each transmission shaft separately may be coupled to the crankshaft by means of a friction clutch. The arrangement of the transmission input shafts may be concentric, with a second transmission input shaft, designed as a hollow shaft, placed around a first transmission input shaft, or with transmission input shafts that are arranged parallel to each other.

Each friction clutch has friction units on the power input and output sides, which may be acted upon by being pressed together axially along an axis of rotation of at least one of the transmission input shafts to form a frictional engagement as frictional counterparts. For example, disks driven by an input part and disks acting on an output part may be stacked alternately to form a disk assembly, where the disks on the output side and/or on the power input side may be given friction linings to increase the coefficient of friction of the frictional counterparts.

The friction units of the two friction clutches are positioned radially one above the other. In order to provide for uniform power transmission performance of the two friction clutches, the two friction clutches may be adjusted to each other; for example, the ring-shaped friction counterparts of the radially outer friction clutch may have a smaller difference between inside and outside diameter, and/or the friction unit of the radially outer friction clutch may have fewer friction elements. It may also be beneficial to choose different friction materials.

The friction units of a friction clutch are pressed against a stop by means of an actuator assigned to the particular friction unit. The actuator may be provided in the form of a disk part or lever part, which may be attached to a rotating, axially fixed part of the clutch so that it can turn relative to the latter, and which, when placed under axial load, presses the frictional counterparts on the power input and output sides against a stop, so that the friction clutch first slips and then holds. It may be beneficial to press, that is, to close the friction clutch only far enough so that the desired torque is transmitted from the combustion engine to the transmission input shaft.

With the actuator of each friction clutch, and with an actuating bearing interposed, an actuating device that operates axially on the particular actuator is arranged, which is connected to a fixed part of the housing in a rotationally fixed connection; both friction clutches are operated in wet mode. In this way it is possible to propose an actuation system without rotating unions, since the hydraulic operating connection between pressure supply device/stationary line/rotating line/pressure piston for applying pressure to the clutch—as in double clutches known in the existing art—may be bypassed by means of a mechanical operating bearing for rotary decoupling of the actuating device and the clutch. In this way, a torque transfer system is also available whose friction clutches may be equipped with the suitable actuating system, independently of how the double clutch transmission is operated—hydraulically, pneumatically, mechanically, or by means of electrical actuation, or by combinations of the above.

A torque transmitting unit having an actuating device that is electrohydraulic may therefore be advantageous. At least one actuating device may be formed of a hydraulic transmitter unit operable by means of an electric motor, comprising a piston/cylinder unit, at least one hydraulic receiver unit applying pressure axially on the corresponding operating bearing, comprising a piston/cylinder unit, and a pressure medium line connecting the transmitter unit and the receiver unit. The receiver unit may have a plurality of sub-units positioned around at least one transmission input shaft, distributed around the circumference, to apply pressure to an operating bearing; to apply pressure to both friction clutches, both receiver units may have sub-units distributed around the circumference, and these may be distributed alternately around the circumference and positioned at approximately the same circumference. Alternatively, a receiver unit for a friction clutch may consist of a pressurizable ring cylinder with a ring piston that is axially movable in it, where two receiver units placed one over the other are able to operate one friction clutch. An arrangement in which an outer ring cylinder is supported on a radially inner ring piston in a manner that forms a seal, so that it is directly axially displaceable, may be especially advantageous, with separate pressure chambers being provided for the two pistons so that the two clutches may be operated independently of each other.

In particular for drive trains having a hydraulically actuated double clutch transmission with a pump and a controller for controlling the hydraulic components of the circuit, it may be advantageous to include receiver units for applying pressure to the operating bearings directly into a wall of the transmission housing, these being supplied with pressure from the pump under the control of the controller and actuating the clutches. It may be advantageous to use such an arrangement for a single clutch in combination with a hydraulically controlled automatic transmission such as an automated shift gearbox (ASG) or a continuously variable transmission (CVT). Here a piston-cylinder unit may be incorporated into the wall of the transmission and/or the corresponding controller, or at least one piston may be placed in a cylinder incorporated into the wall of the housing or the controller so that it is axially displaceable.

Another exemplary embodiment may provide an electromechanical actuating device, the pressure being applied to at least one friction clutch by means of an electric motor rotary drive positioned essentially perpendicular to one of the transmission input shafts, the rotary motion being converted by means of a transmission to a linear motion along one of the transmission input shafts to apply pressure to the corresponding operating bearing. In this connection see for example German patent application No. 103 40 528.3, the content of which is included in its entirety in the present application. Alternatively, the pressure may be applied to at least one friction clutch by means of an electric motor rotary drive positioned essentially parallel or concentric to one of the transmission input shafts, the rotary motion being converted by means of a transmission to a linear motion along that transmission input shaft to apply pressure to the corresponding operating bearing. In this connection see for example German patent publication No. DE 100 33 649 A1.

Naturally the two friction clutches which are operated in wet mode may necessarily be closed clutches in special applications, which are disengaged through the use of an axial force. But in standard applications these friction clutches are pressure-closed clutches; that is, when they are not under pressure from the actuating device they are disengaged, and become engaged through application of an axial force.

To cool the at least one of the friction clutches, in particular if great frictional heat develops as a result of slippage, it may be beneficial to provide a stream of coolant by means of a pump to cool at least one friction clutch. For operation in a manner largely independent of the transmission, this pump may be located in the area of a clutch housing formed between a wall of the combustion engine and a wall of the double clutch transmission. A stream of coolant may be drawn in by means of the pump from an oil sump common to the transmission or from the transmission itself, or a separate oil circuit for the friction clutches may be provided. In addition it may be advantageous, in particular if there is no hydraulic pump present for controlling the transmission, to design the performance of the pump so that it is possible to provide the stream of coolant. The pump may be driven by the crankshaft, or by a component that is connected to the latter. For example, if the pump is positioned on the transmission housing, a component of the clutch in the vicinity of the transmission may be geared with the pump. In an advantageous manner, this is a component connected with the disk carrier, which drives the ring gear of an internal gear pump which is positioned radially farther out by means of a gear, the internal gear pump being advantageously placed in an area that saves construction space, for example between two lugs of the transmission. Naturally, the pump may also be electrically driven. The driving by the crankshaft or an electric motor may be accomplished by means of a gear connection, a belt drive, a chain drive, or the like.

The internal gear pump may be driven by means of a ring gear with an internal tooth system, where the internal tooth system meshes with an external tooth system of a sun gear and a suction crescent is provided to draw the coolant. In an advantageous manner, the sun gear may be supported radially by means of its external tooth system on a complementary segment of the suction crescent, so that separate support of the sun gear is unnecessary. Optionally, the use of a gerotor pump may also be advantageous. To minimize the energy need of the pump, its volumetric flow may be regulated by means of suction throttling, where the suction throttling may be achieved by means of an electromagnetic valve. In this way, up to a specified speed of rotation the volumetric flow for example may be proportional to the drive speed, and above a limiting speed it may be held at a constant value. Experimental values have shown that restricting the coolant pressure to 5 bar, preferably 3 bar, and a maximum volumetric flow of 36 l/min, preferably 24 l/min, may be advantageous. In an advantageous manner, an oil cooler may be connected between the pump and the friction units of the friction clutches. The coolant may escape into the sump through an appropriate opening in the chamber, while it may be advantageous to capture coolant that has been forced radially outward as a result of the effect of centrifugal force, using a dipping tube that is rigidly attached to the housing, and to guide it into the sump. A dipping tube of this sort may be combined advantageously with other functional elements into a single component, for example a receiver unit.

According to the inventive concept, the clutch housing may be filled up to a certain oil level with a coolant or pressure agent, for example normal commercial ATF.

It is especially advantageous, however, if a separate chamber with a liquid-proof seal separating it from the clutch housing is formed in the clutch housing between a wall of the combustion engine and a wall of the double clutch transmission, in which at least the two friction clutches are accommodated. It is also possible to share the construction space with the transmission. This chamber may be formed by a part that wraps around both friction clutches, for example a pot-shaped input part such as a disk carrier, while a part connected to it may be mounted with a sealed and rotatable mount on a stationary part such as for example a component of the actuating device or of the transmission housing. Alternatively, to form the chamber a disk part may be rigidly connected to the transmission housing, and rotatable and liquid-tight on a rotating part, for example the hub of the input part.

To reduce or eliminate torsional vibrations introduced into the transmission from the combustion engine, a dual mass flywheel positioned between the crankshaft and the input part of the two friction clutches may be provided at the torque transmitting unit. This dual mass flywheel may be integrated into the liquid-filled chamber (530, 630) or it may be located outside the chamber. In addition, the dual mass flywheel may form part of the housing for the chamber and/or may have a drive part for the pump. The dual mass flywheel may be mounted on the crankshaft by means of an axially flexible disk part, a so-called "flexplate." Of course, the torque transmitting unit may also be mounted on the crankshaft in this way without a dual mass flywheel. It can be especially advantageous in connection with the mass conditions of a double clutch with wet clutches to design two masses that are relatively rotatable with respect to at least one energy storage device that acts in the circumferential direction so that they may be coupled together at least temporarily, the coupling being achievable by mean of a friction device that depends on centrifugal force. The use of a coupling may be especially advantageous with the following mass conditions: a first mass, coupleable on the drive side, has a moment of inertia of $0.1 \pm 0.04$ kgm$^2$, and a second mass on the drive side has a moment of inertia of 0.04 to 0.08 kgm$^2$. It has also proven advantageous to maintain the coupling of the two masses up to a range of 1,200 to 1,800 revolutions per minute.

The torque transmitting unit may be installed by mounting the complete component with receiver unit and with dual mass flywheel, if used, on the transmission shafts of the double clutch transmission, and connecting it with a rotationally fixed connection to an axially flexible drive component which is connected to the crankshaft, such as a "flexplate," when joining the combustion engine and the transmission. It may also be advantageous to connect parts of the dual mass flywheel, or the entire dual mass flywheel, to the crankshaft separately from the clutch unit, and to use connecting elements such as plug-in connections which permit axial movability and rotationally fixed connection of the connected parts to produce a connection between the combustion engine and the transmission. For purposes of guiding the torque transmitting unit, there may be a pilot bearing on the latter by means of which the torque transmitting unit is rotatably mounted on the crankshaft. It may also be advantageous to support the torque transmitting unit on the crankshaft axially, for example by means of a slide bearing. It may be especially advantageous when installing the torque transmitting unit to adjust it or its movable components axially only roughly, to connect the actuating device to the transmission housing with a rotationally fixed connection, but so that it can move laterally, and when operating the torque transmitting unit for the first time to move it to its final position by means of self-adjusting, axially operating pressure of the transmission oil (ATF) on the axially movable components, for example by having them run into appropriately positioned stops.

In an especially preferred exemplary embodiment there may be for example a torque transmitting unit in which the sun gear of the pump has a bearing stub which supports the sun gear on one side. The bearing stub is preferably short, and serves only to provide radial support for the slight radial forces. The sun gear itself is guided between two parallel-plane surfaces of the housing walls. The shortness of the guide is necessary so as not to overdefine the parts.

Another preferred exemplary embodiment of the torque transmitting unit is characterized in that the ring gear is coupled with the gear of the pump in a rotationally fixed coupling. For reasons of noise, the gear of the pump is preferably equipped with helical teeth. In the case of a one-piece connection between the ring gear and the gear of the pump, axial forces would occur during operation of the pump which would press the ring gear against a wall of the pump housing. That would result in a large leakage gap on one side and a small gap on the other side. That would cause degradation of the volumetric efficiency of the pump, since the width of the gap influences the leakage to the third power. Because of the pressure against one side, there would also be an additional loss from drag. These disadvantages can be avoided with the two-piece version of the pump gear and ring gear according to the present invention. The torque connection preferably occurs by means of at least one lug for example, sintered onto the ring gear or the pump gear, or by an additional insert.

Another preferred exemplary embodiment of the torque transmitting unit is characterized in that the pump gear meshes with a drive gear which is coupled with the help of a coupling device to an input part of one of the friction clutches in a rotationally fixed coupling. The coupling device is preferably a sheet metal part. The sheet metal part that forms the coupling device has a plurality of functions. First, it transmits the torque of the pump to the drive gear. In addition, the sheet metal part serves as an oil lead-through for guiding the cooling oil through the drive gear.

Another preferred exemplary embodiment of the torque transmitting unit is characterized in that the coupling device has at least one drive lug, which engages a lug recess on the drive gear. The drive lug ensures that the torque of the pump is transmitted from the coupling device to the drive gear.

Another preferred exemplary embodiment of the torque transmitting unit is characterized in that the coupling device has a passage section with connecting grooves which are positioned between the drive gear and a bearing device, by which the drive gear is supported on one of the transmission input shafts. The connecting grooves are for example a type of a tooth system formed in the sheet metal part, and permit cooling oil to pass through between the bearing device and the drive gear, viewed in the radial direction. The connecting grooves may also have a twist, in order to support the flow of oil.

Another preferred exemplary embodiment of the torque transmitting unit is characterized in that the coupling device has a section with a tooth system, through which the coupling device is connected to a coupling element so that it cannot turn. The coupling element is preferably another sheet metal part, through which the coupling device is connected with the input part of one of the friction clutches in a rotationally fixed coupling.

Another preferred exemplary embodiment of the torque transmitting unit is characterized in that the coupling element has a centering section which is in contact with one of the operating bearings. By means of the centering section, the coupling element is preferably centered on the inner operating bearing, on its inner ring. Preferably, the coupling element is connected with the inner ring by an interference fit. The rotation between the coupling element and the input part of one of the friction clutches can be controlled by at least one outwardly bent lug, which is connected in a rotationally fixed connection to an operating lever of one of the friction clutches.

Another preferred exemplary embodiment of the torque transmitting unit is characterized in that the pump has a pump cover with which the drive gear can come into contact in the axial direction. Preferably, the pump cover surrounds the drive gear in such a way that an axial force resulting from the helical tooth system is absorbed by the pump cover. That produces an additional seal between the pump cover and the drive gear.

Another preferred exemplary embodiment of the torque transmitting unit is characterized in that the pump is mounted on a section of the transmission housing with which the drive gear can come into contact in the axial direction. In this version the drive gear is preferably swung in the other direction by the tooth system, so that a seal occurs between the drive gear and the section of transmission housing.

Another preferred exemplary embodiment of the torque transmitting unit is characterized in that the stream of coolant is conducted through a through hole in the sun gear of the pump. That provides a simple means of filling the pump on two sides, and the pump may be filled well in the non-suction-regulated state with the necessary cooling of the clutch.

BRIEF DESCRIPTION OF THE DRAWINGS

Additional advantages, characteristics, and details of the present invention are evident from the following description, in which various embodiments are described in detail with reference to the drawing. The characteristics mentioned in the claims and in the description may be essential to the invention individually by themselves or in any combination. The figures show the following:

DESCRIPTION OF THE PREFERRED EMBODIMENTS

Figure 1:
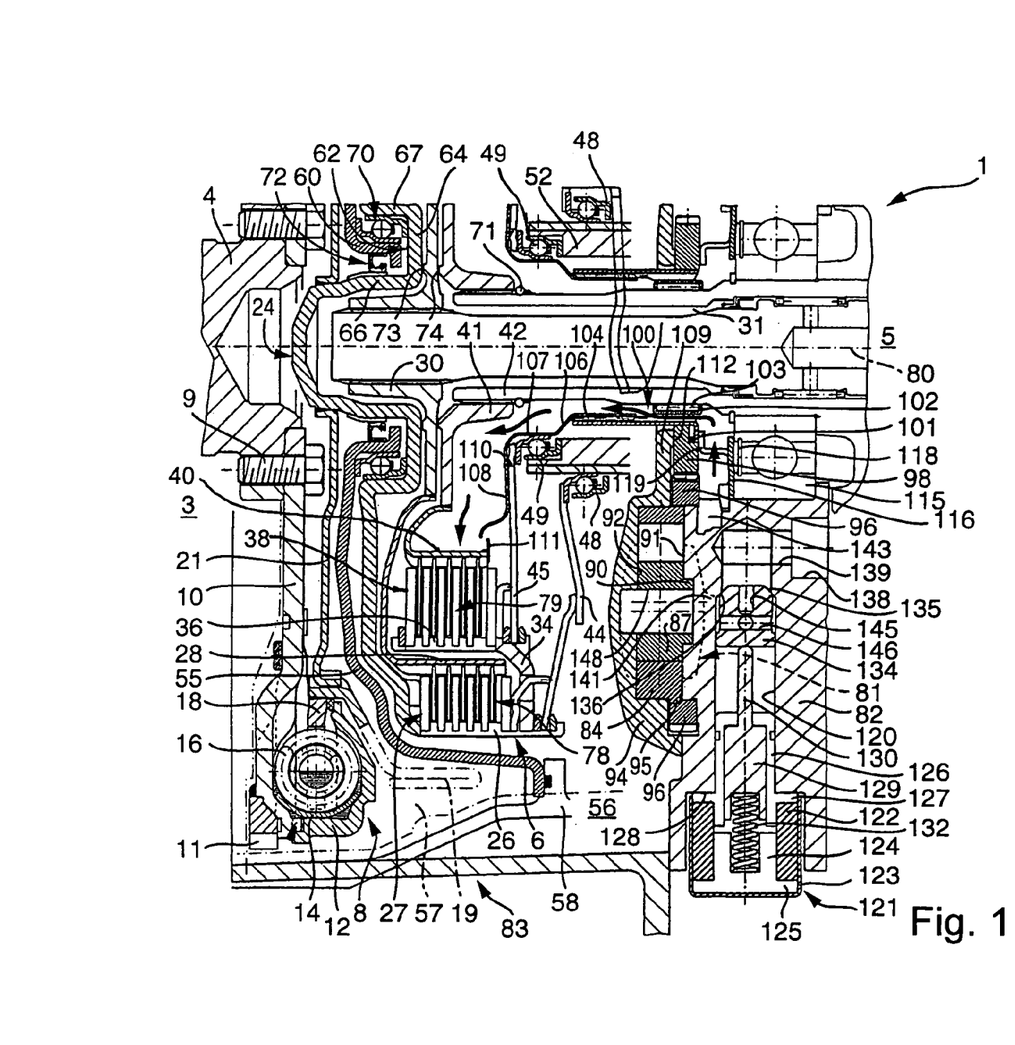
FIG. 1 shows a partial section of a torque transmitting unit according to a first exemplary embodiment, having a built-in pump.

Part of a power train 1 of a motor vehicle is illustrated in FIG. 1. Positioned between a drive unit 3, in particular a combustion engine, from which a crankshaft 4 extends, and a transmission 5, is a wet operating double clutch 6 of multiple-disk design. Connected between drive unit 3 and double clutch 6 is a vibration damping unit 8. The vibration damping unit is preferably a dual mass flywheel.

Crankshaft 4 of combustion engine 3 is rigidly connected through a screw connection 9 to an input part 10 of vibration damping unit 8. Input part 10 of vibration damping unit 8 has essentially the form of a circular ring positioned in the radial direction, to which a starter gear rim 11 is welded radially on the outside. In addition, a centrifugal mass 12 is welded onto the input part 10 of vibration damping unit 8. Furthermore, attached to input part 10 of vibration damping unit 8 is a vibration damper cage 14, which at least partially incorporates a plurality of energy storage devices, in particular spring devices 16. An output part 18 of vibration damping unit 8 engages spring devices 16. Another centrifugal mass 19 is attached to input part 18 of vibration damping unit 8. Output part 18 of vibration damping unit 8 is rigidly connected through a connecting part 21 to an input part 24 of double clutch 6. Clutch input part 24 is joined in one piece to an outer disk carrier 26 of a first multiple-disk clutch arrangement 27. Positioned radially outwardly of outer disk carrier 26 is an inner disk carrier 28 of first multiple-disk clutch arrangement 27. Inner disk carrier 28 is attached radially inside to a hub piece 30, which is connected through a tooth system to a first transmission input shaft 31 in a rotationally fixed connection.

Clutch input part 24, or outer disk carrier 26 of first multiple-disk clutch arrangement 27, which is connected to the latter in a single piece, is connected through a connecting part 34 to an outer disk carrier 36 of a second multiple-disk clutch arrangement 38 in a rotationally fixed connection. Positioned radially inwardly of outer disk carrier 36 is an inner disk carrier 40 of second multiple-disk clutch arrangement 38, which is rigidly connected radially on the inside to a hub part 41. Hub part 41 is connected through a tooth system in a rotationally fixed connection to a second transmission input shaft 42, which is designed as a hollow shaft. First transmission input shaft 31 is positioned in second transmission input shaft 42 so that it can rotate. In this figure the levers are operated by pistons.

The two multiple-shaft clutch arrangements 27 and 38 are operated by means of operating levers 44 and 45, whose radially inner ends are supported on operating bearings 48, 49. Operating bearings 48, 49 are operated in the axial direction with the help of operating pistons 51, 52. Operating pistons 51, 52 are arranged in fixed positions with respect to operating levers 44, 45, which rotate with clutch input part 24.

Positioned between connecting part 21 and outer disk carrier 26 of first multiple-clutch arrangement 27 is a clutch cover 55, which is attached radially on the outside to a transmission housing section 58. Clutch cover 55 may also be made in a single piece with transmission housing section 58. Clutch cover 55 separates a wet chamber 56, in which the two multiple-disk clutch arrangements 27 and 38 are positioned, from a dry receiving chamber 57, in which vibration damping unit 8 is positioned. Clutch cover 55 has, radially on the inside, an essentially L-shaped end 60, viewed in cross section, which projects into a ring chamber 62 that is formed by a section of clutch input part 24 with a U-shaped cross section. The U-shaped cross section of ring chamber 62 contains a radially arranged base 64, from which two legs 66 and 67 extend in the axial direction.

Between clutch input part 24 and clutch cover 55 is a thin ring ball bearing 70, which is supported in both the radial and the axial directions on end 60 of clutch cover 55 on the one hand, and on the base 64 and the leg 67 of clutch input part 24 on the other hand. Thin ring ball bearing 70 has a contact normal which is tilted from the radial direction.

Radially inside of and coaxial with thin ring ball bearing 70 is a radial shaft seal ring 72, positioned between end 60 of clutch cover 55 and clutch input part 24. Thin ring ball bearing 70 is positioned completely in wet chamber 56, which is separated from dry chamber 57 by radial shaft seal ring 72. Thin ring ball bearing 70 may be pre-mounted either on clutch cover 55 or on clutch input part 24. The other part may slide over the corresponding bearing ring during assembly. In the area of the bearing device no additional axial retaining rings are necessary. Shifting of the parts toward transmission 5 is limited by stops 73 and 74 inserted in series on hub parts 30 and 41, as well as a retaining ring 71 on second transmission input shaft 42. The solutions depicted in FIGS. 1 through 4 are also usable for single clutches.

Each friction clutch 27, 38 has friction units 78, 79 on the power input and output sides, which may be acted upon by being pressed together axially along an axis of rotation 80 of at least one of the transmission input shafts 31, 42 to form a frictional engagement. Friction units 78, 79 of the two friction clutches 27, 38 are positioned radially one above the other. Friction units 78, 79 are formed of a plurality of alternating frictional counterparts from the power input and output sides, stacked in the axial direction.

A stream of coolant is supplied by means of a pump 81 to cool at least one friction clutch 27, 38. The pump is located in the area of a clutch housing 83 formed between a wall of the combustion engine 3 and a wall of the double clutch transmission 5. Pump 81 is mounted on a transmission housing section 82. Pump 81 is preferably used exclusively for supplying the stream of coolant and for lubricating. Pump 81 is an internal gear pump, in particular a gerotor pump, which is driven from crankshaft 4.

Pump 81 includes a ring gear 84, which is engaged by outer tooth system 88 of a gear 87. Depending on the type of pump construction, a suction crescent may be provided to draw the coolant.

Because the pump circulates only the oil for lubricating and cooling, the maximum pressure needed is very low. This means that the mechanical demand on the parts is slight. The result is that it is possible to make pump cover 94, pump gears 81, 87 and possibly also drive gears 98/96 out of plastic, preferably a thermosetting material. This is more cost-effective compared to sintered material and the requisite mechanical reworking, since with the plastic parts most of the mechanical reworking can be dispensed with. The housing around the intake regulating valve and the valve piston of the intake regulating valve may also be of plastic, if the design makes it possible to integrate the intake regulating valve into the pump cover or to place it in a separate part in which no bearing forces of the transmission shafts have to be supported.

Sun gear 87 has a central bearing stub 90, and is provided with a central through bore which runs in the axial direction. Bearing stub 90 is accommodated so that it can rotate in a circular recess in transmission housing section 82. Bearing stub 90 is intentionally made short, and serves only to provide radial support for the slight radial forces that occur during operation of pump 81. Sun gear 87 is guided by placing it between two parallel-plane surfaces 91, 92 on transmission housing section 82 and on pump cover 94, which is screwed onto transmission housing section 82. The shortness of bearing stub 90 is necessary so as not to overdefine the parts statically.

Radially on the outside of ring gear 84 at least one drive lug 95 is formed, which engages a complementarily formed recess which is provided radially on the inside on a pump gear 96. Pump gear 96 meshes with a drive gear 98, which, like pump gear 96, has a helical tooth system. The helical tooth system is preferable for reasons of noise. Otherwise a straight tooth system could be used. It is also possible to form pump gear 96 in a single piece with ring gear 84. However, in the case of a single-piece connection of ring gear 84 of pump 81 with pump gear 96, axial forces arise which constantly press ring gear 84 against a wall of the pump housing. This results in a large leakage gap on one side and a small gap on the other side. That causes degradation of the volumetric efficiency, since the width of the gap influences the leakage to the third power. Because of the pressure against one side, additional loss from drag also occurs. These disadvantages can be avoided with the divided version of ring gear 84 and pump gear 96 according to the present invention. The entrainment of torque occurs through drive lug 95, which may for example be sintered on; it may be formed either on ring gear 84 or on pump gear 96, or by an additional insert.

Drive gear 98 is driven through a coupling device 100, which is formed of a sheet metal part. Coupling device 100 has essentially the form of a circular cylindrical jacket, which is positioned concentrically to the axis of rotation 80. On the end of coupling device 100 facing transmission 5 at least one drive lug 101 is formed, which engages a complementarily formed recess which is provided radially on the inside on drive gear 98. From drive lug 101 extends a passage section 102 which, viewed in the radial direction, is located between drive gear 98 and a needle bearing 103 by which drive gear 98 is rotatably supported on transmission input shaft 42. In addition to its bearing function, passage section 102 serves to enable the passage of coolant between needle bearing 103 and drive gear 98. For this purpose there are connecting grooves formed in passage section 102, which run in the axial direction, for example in the nature of a tooth system. The connecting grooves may also have a twist, in order to support the flow of coolant.

Instead of needle bearing 103, a journal bearing may also be used for radial support of drive gear 98 on transmission input shaft 42. At the end of coupling device 100 facing combustion engine 3 a toothed section 104 is formed, through which coupling device 100 is connected to a coupling element 106 in a rotationally fixed connection. Coupling element 106 is formed by a sheet metal part that has a toothed section, which is formed complementarily to toothed section 104 of coupling device 100. The intermeshed a tooth system makes axial shifting of coupling element 106 relative to coupling device 100 possible. Coupling element 106 has a centering section 107, with which coupling element 106 is centered radially to the inside of the inside ring of inner operating bearing 49, which is also called the engaging bearing, for example in the form of an interference fit.

In the direction of combustion engine 3, coupling element 106 has a guide section 108 extending in the radial direction, which is in contact with operating lever 45. Coupling element 106 is connected to operating lever 45 with a rotationally fixed connection through at least one drive lug 110. The inside ring of operating bearing 49 and operating lever 45 both rotate at engine speed. In consequence, pump 81 is driven indirectly by the combustion engine. Because of the axial movement of engagement bearing 49 when multi-disk clutch arrangement 38 is operated, the radial outer end of guide section 108 is not connected to inner disk carrier 40 of multi-disk clutch arrangement 38. On the end of inner disk carrier 40 facing the transmission there is a guide section 111, which is intended to reduce the escape of coolant.

Pump cover 94 has an extension 109 radially on the inside, which extends past pump gear 96 to drive gear 98. On extenions 109 an axial stop 112 is formed for drive gear 98. Stop 112 prevents unwanted reaction of drive gear 98 when the combustion engine is turned off. As may be seen in FIG. 3, among other things, pump cover 94 was intentionally wrapped around drive gear 98 in order to close the leakage path caused by the helical teeth of the gear and to guide the oil under gear 98 through to the clutch. On the right side, as described below, sealing is provided by a sealing washer 116.

Transmission input shaft 42 is supported on transmission housing section 82, at least in the radial direction, with the help of a bearing device 115. Sealing washer 116, whose side facing combustion engine 3 is against bearing device 115, prevents coolant from escaping through bearing device 115. Alternatively, a sealing washer 118 may also be provided in bearing device 115 for this purpose. From sealing washer 116 a bent arm extends toward combustion engine 3, on which an axial stop 119 is formed for drive gear 98, which is positioned opposite stop 112 on extension 109 of pump cover 94.

In transmission housing section 82 there is a blind hole 120, which receives an intake regulating valve 121. Intake regulating valve 121 includes a magnet 122, which is shielded from the surroundings by a housing 123. Magnet 122 is in the shape of a ring, with rectangular cross section. Inside of magnet 122 is a sleeve 124, on whose outer end a flange 125 is formed. At an axial distance from sleeve 124, toward the inside in reference to blind hole 120, is an additional sleeve 126, which has a flange 127. Flange 127 lies against a shoulder 128, which is formed at the outer end of blind hole 120.

Sleeve 126 contains a control piston 129 which is movable back and forth, at whose inward-directed end, referenced to blind hole 120, a tappet 130 is formed. The outer end of control piston 129 is under pressure from a helical compression spring 132, which is pre-stressed between control piston 129 and sleeve 124. The pre-stressing force of spring 132 causes the free end of tappet 130 to be pressed against a valve piston 134, which is movable back and forth in blind hole 120. Blind hole 120 extends in the radial direction toward axis of rotation 80. At the radial inner end of valve piston 134 a sealing surface 135 is formed, which is in contact with a seat 136 when valve piston 134 is in the position shown in FIG. 1.

The coolant passes through a connection 138, through a linking bore 139 functioning as an orifice, to valve piston 134. When valve piston 134 lifts its sealing surface 135 from seat 136, the coolant flows past valve piston 134 to a channel 141, which is indicated with broken lines in FIG. 1. The coolant drawn in by pump 81, for example oil, passes through an oil cooler (not shown) to the place 143 where it exits from transmission housing section 82. In the closed position of valve piston 134 shown in FIG. 1, a reduced stream of coolant flows through a longitudinal bore 145 and a transverse bore 146 in valve piston 134, from connection 138 to channel 141.

Figure 2:
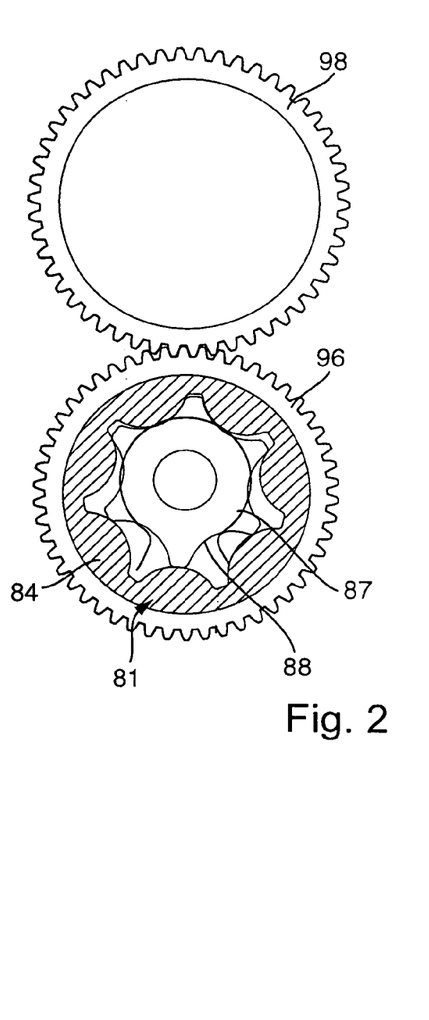
FIG. 2 shows a sectional view through the pump.

FIG. 2 shows a sectional view of pump 81. The cooling oil pump 81 is an internal gear pump, in particular a gerotor pump. Pump 81 comprises primarily ring gear 84 and sun gear 87, as well as pump cover 94, which is bolted together with transmission housing section 82. Additional sealing of the center of sun gear 87, as in the case of pumps driven through the sun gear, is not necessary.

The pump shown in FIGS. 1 and 2 works as follows: The oil flowing through the transmission housing to cool the clutch exits from the transmission housing at point 143 and is conducted between drive gear 98 and coupling device 100, past coupling element 106 nearly without leakage, to the inner disk carrier of the inner clutch. As it does so, sealing washer 116 seals the leakage path through bearing device 115 of hollow shaft 42. This sealing can also be accomplished by sealing washer 118 in the bearing itself or by a shaft seal ring. This specific routing of the oil simultaneously ensures the lubrication of needle bearing 103 and of drive gear 98, as well as of pump gear 96.

Because coupling device 100 and coupling element 106 rotate at engine speed, and it can occur when the vehicle is braked to a complete stop that inner disk carriers 28 and 40 are at a standstill (steep condition, breakaway of the vehicle on a grade, or under heavy load), because of the centrifuged stream of oil a uniform distribution of oil over the inner disk carrier of the inner clutch is achieved. To prevent the cooling oil from escaping during operation, pump cover 94 is wrapped around drive gear 98. The axial force arising from the helical tooth system presses drive gear 98 against pump cover 94 and thus provides additional sealing, as can be seen better in FIG. 3.

When no current is flowing through magnet 122, valve piston 134 of intake regulating valve 121 is pressed with its sealing surface 135 against seat 136 by spring 132. Hence the stream of cooling oil drawn in through connection 138 can only be routed through bores 145,146, which form a throttle, to two suction pockets formed in pump 81. In this mode, pump 81 operates in the down-regulated state. In this state only minimum oiling of the clutch can be ensured, since the clutch is closed or a regulation of slippage is being performed.

In the non-down-regulated state, tappet 130 moves downward and thus valve piston 134 is also in its open position. At the same time, valve piston 134 lifts its sealing surface 135 off of seat 136 and opens the link from connection 138 to channel 141. To reach the suction pocket on the side of sun gear 87 facing away from transmission housing section 82, the stream of oil is conducted through a throughbore 148 in the center of sun gear 87. That provides a simple means of filling pump 81 on two sides, and the pump may be filled well in the non-down-regulated state with the necessary cooling of the clutch. To limit the volumetric flow at high temperatures and high rotational speeds, even in the non-down-regulated state, the linking bore 139 between connection 138 and blind hole 120 has a constricted cross section.

Figure 3:
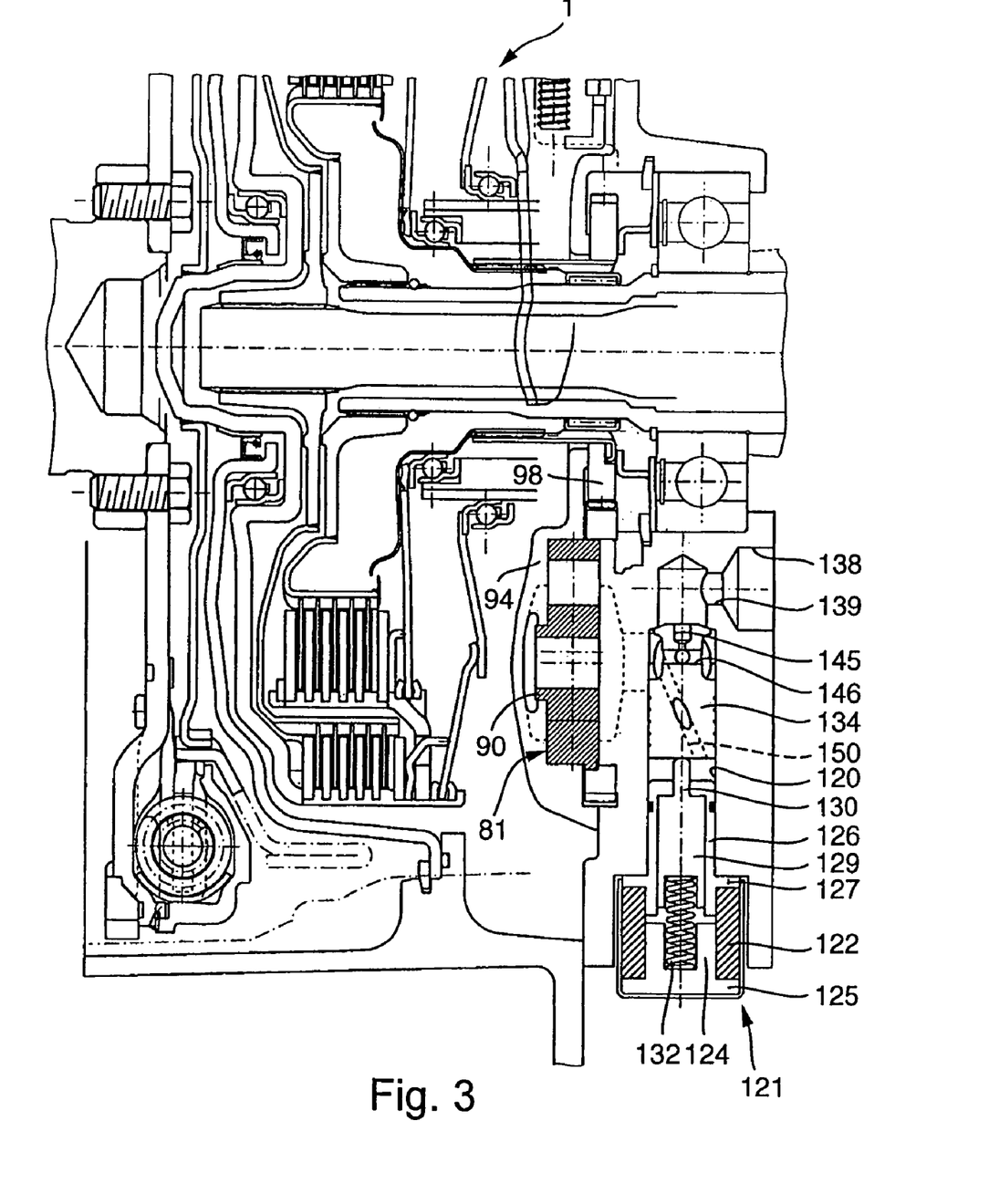
FIG. 3 shows a torque transmitting unit similar to that in FIG. 1 according to a second exemplary embodiment.
Figure 4:
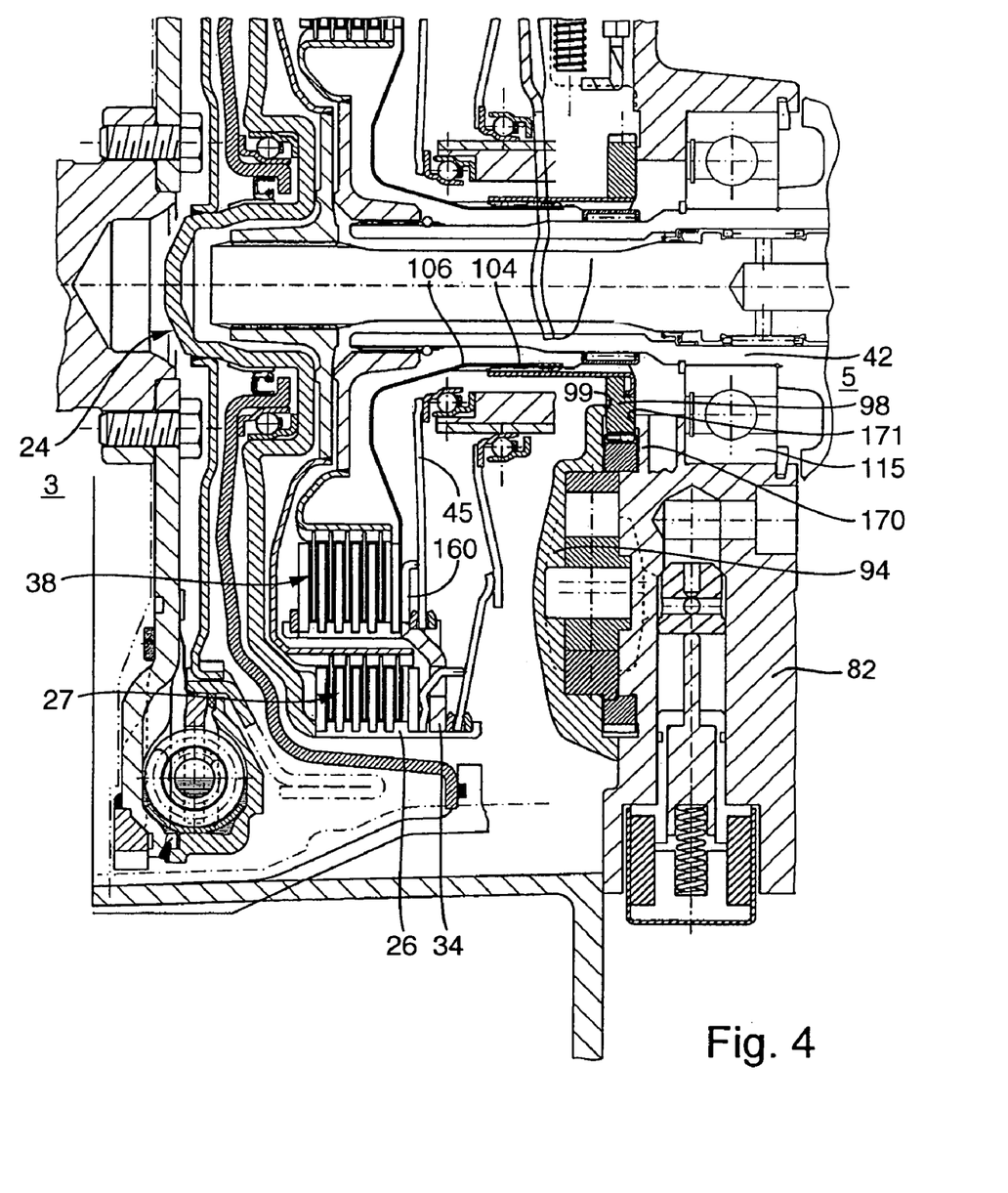
FIG. 4 shows a torque transmitting unit similar to that in FIG. 1 according to a third exemplary embodiment.

FIGS. 3 and 4 show depictions similar to that in FIG. 1. The same reference numerals are used to designate the same parts. However, for the sake of clarity only a few reference numerals are shown in FIGS. 3 and 4. To avoid repetitions, reference is made to the preceding description of FIG. 1. In the following description only the differences between the embodiments will be described.

In FIG. 3 valve piston 134 is longer than in the exemplary embodiment shown in FIG. 1, in order to improve its guidance in blind hole 120. Moreover, valve piston 134 is provided with a linking channel 150, which enables coolant to pass through as valve piston 134 moves back and forth, and provides for pressure equalization. In FIG. 1 this is ensured by large play between 134/120 and a small notch on the outside diameter of piston 134.

In the exemplary embodiment shown in FIG. 4, bearing 115 of hollow shaft 42 is mountable from the transmission side. In an area 170, transmission housing section 82 is drawn in radially in such a way that it forms a stop 171 for drive gear 98 on the side facing combustion engine 3. On the side facing transmission 5, wall area 170 forms a stop for bearing device 115. In the exemplary embodiment shown in FIG. 4, the tooth system of drive gear 98 and of pump gear 96 is slanted in the opposite direction from that in the preceding exemplary embodiments.

A stop 99 provided in FIG. 4 on pump cover 94 is only needed locally at one place, in order to limit the leftward shifting of drive gear 98. Sealing is provided during operation by the fact that the gear is pressed to the right against the transmission housing because of its diagonal tooth system. Here it is in full-surface contact. If necessary, a hardened contact disk can be placed between the gear and the transmission housing or between the gear and the pump housing in FIG. 1.

In addition, in the exemplary embodiment shown in FIG. 4 coupling element 106 is not centered on the inner engagement bearing, but is hung on outer disk carrier 26 of outer multiple-disk clutch 27. That produces a rotationally fixed connection between clutch input part 24 and drive gear 98. The radially outer end of coupling element 106 is in contact with a pressure piece 160, which forms a support for operating lever 45.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A torque transmitting unit for a motor vehicle power train for transmitting torque between an engine having an output shaft and a transmission having at least one transmission input shaft, said torque transmitting unit comprising:

a friction clutch operatively connected between the engine output shaft and the at least one transmission input shaft, the clutch including a plurality of alternating frictional components stacked in an axial direction;

an operating member arranged to transmit an axial force to press the frictional components together;

an actuator for applying an axial force to the operating member and connected to a fixed housing part in a rotationally fixed connection;

an operating bearing positioned between the actuator and the operating member to permit rotation of the operating member relative to the actuator;

wherein the friction clutch is operated as a wet mode clutch for cooling the clutch; and a pump indirectly rotatably coupled with the engine output shaft for providing cooling oil to the clutch, wherein a rotatable coupling drive for rotating the pump is arranged concentrically with the at least one transmission shaft, and the pump has an axis of rotation that is radially offset from the axis of rotation of the at least one transmission input shaft.

2. A torque transmitting unit in accordance with claim 1, wherein the rotatable coupling drive is concentrically connected with a first drive gear that meshes with a second drive gear that rotatably drives the pump, wherein the second drive gear has an axis of rotation that is radially offset from the at least one transmission input shaft.

3. A torque transmitting unit in accordance with claim 2, wherein the second drive gear is axially moveable relative to the pump.

4. A torque transmitting unit in accordance with claim 2, wherein the second drive gear includes at least one drive lug that engages a lug recess formed on the first drive gear.

5. A torque transmitting unit in accordance with claim 2, wherein the first and second drive gears each have helical teeth.

6. A torque transmitting unit in accordance with claim 1, wherein the pump is a gerotor pump having a ring gear with an internal tooth system, with which a sun gear having an external tooth system meshes.

7. A torque transmitting unit in accordance with claim 6, wherein the sun gear of the pump includes a bearing stub on one side for rotatably supporting the sun gear.

8. A torque transmitting unit in accordance with claim 1, wherein the coupling drive serves as an oil guide from the pump to the clutch frictional components.

9. A torque transmitting unit in accordance with claim 1, including an electromagnetic intake regulating valve for regulating oil flow from the pump.

10. A torque transmitting unit in accordance with claim 9, wherein the electromagnetic intake regulating valve includes a valve piston having a linking channel to enable fluid to pass through the valve piston as the valve piston moves back and forth, to provide for pressure equalization.

11. A torque transmitting unit in accordance with claim 10, wherein the valve piston is received within a blind bore formed in a transmission housing section, and including sufficient free play provided between the valve piston and blind the bore to enable coolant to pass therebetween as the valve piston moves back and forth, to provide for pressure equalization.

12. A torque transmitting unit in accordance with claim 10, including a notch provided on an outside diameter of the valve piston to enable coolant to pass through the notch as the valve piston moves back and forth, to provide for pressure equalization.

* * * * *